3,492,086
METHOD OF PRODUCING SUPERSATURATED SOLUTIONS OF ALUMINUM FLUORIDE
Arnfinn Ve, Bergen, Magne Klovning, Porsgrunn, and Rolf Strommen, Alesund, Norway, assignors to Elektrokemisk A/S, Majorstua, Oslo, Norway, a corporation of Norway
No Drawing. Filed Mar. 1, 1967, Ser. No. 619,557
Claims priority, application Norway, Mar. 22, 1966, 162,212
Int. Cl. C01f 7/50
U.S. Cl. 23—88          6 Claims

ABSTRACT OF THE DISCLOSURE

Supersaturated solutions of aluminum fluoride are produced with substantially 100% efficiency by reacting a solution of hydrofluoric acid with an excess of aluminum oxide.

---

This invention relates to a method of producing supersaturated solutions of aluminum fluoride.

As is known, aluminum fluoride, $AlF_3$, is produced conventionally by precipitating its trihydrate, $AlF_3 \cdot 3H_2O$, from a supersaturated $AlF_3$ solution. The supersaturated $AlF_3$ solution is usually formed by reacting aluminum metal, aluminum hydroxide, or bauxite with fluorine-containing materials such as HF, $H_2SiF_6$, $HBF_4$, etc. Attempts also have been made to form the supersaturated $AlF_3$ solution by reacting aluminum oxide, $Al_2O_3$, with a dilute solution of HF. However, the efficiency and yield of this process have proven to be very poor. In particular, reaction has been attempted between stoichiometric amounts of $Al_2O_3$ and HF as well as up to 100% of excess HF, but only a maximum of 6% of the fluorine content of the HF could be converted to $AlF_3$ by these methods.

The present invention is based upon a surprising and unexpected discovery that reaction between $Al_2O_3$ and dilute HF solutions may be carried out with substantially 100% efficiency and yield if a substantial excess of $Al_2O_3$ over the stoichiometric proportion is used. More specifically, it has been found possible to convert substantially all of the fluorine content of dilute HF solutions into a supersaturated $AlF_3$ solution if the HF solution is reacted with an amount of $Al_2O_3$ which is in excess by at least about 50% beyond the stoichiometric proportion. In terms of actual weight, the invention accordingly is based on the discovery that substantially complete reaction may be achieved between $Al_2O_3$ and HF solutions if the ratio of dry weight of HF to $Al_2O_3$ is at least about 1:1.275 as contrasted from the ratio of stoichiometric proportions which is 1:0.85.

The practical advantages given by the invention are particularly noteworthy and valuable in connection with the conventional production of aluminum by melt electrolysis. In aluminum plant operations, the off gases emanating from the electrolysis aluminum furnaces contain fluorine which is extracted by washing the off gases with water. The wash water accumulates from 3 to 5% of HF and is often called "tower acid." Whereas prior attempts to utilize the tower acid as raw material for production of supersaturated $AlF_3$ solutions by reaction with $Al_2O_3$ have not been successful, the total fluorine content of the tower acid may be substantially completely recovered as $AlF_3$ by reacting the tower acid with an excess of $Al_2O_3$ in accordance with the invention. Thus, an economic credit is achieved by the invention corresponding to the value of the fluorine contained in the tower acid. In addition, further savings are realized by the fact that the cost of aluminum in the form of aluminum oxide is lower than as aluminum hydroxide, and by the fact that all aluminum plants maintain large supply stocks of aluminum oxide at hand. Thus, the invention permits drawing upon the same supply stocks to recover the fluorine content of the tower acid without having to incur expenses for extra storage units, hoppers and other supply equipment as would be required if a separate raw material were used for reaction with the tower acid.

Briefly stated, the process of the invention comprises reacting an aqueous solution of hydrofluoric acid with solid aluminum oxide in an HF to $Al_2O_3$ dry weight ratio of at least about 1:1.275 to form a supersaturated solution of $AlF_3$.

The weight ratio specified above is a minimum which must be observed in order to form supersaturated $AlF_3$ solutions with the remarkable efficiency and yields provided by the invention. However, this ratio may be increased to increase the degree of excess of $Al_2O_3$ over the stoichiometric proportion. Thus, the weight ratio of HF to $Al_2O_3$ may be increased up to about 1:12 and the conversion of substantially 100% of the initial HF solution to $AlF_3$ in accordance with the invention may be achieved with any weight ratio within the range from about 1:1.275 to about 1:12.

In carrying out the reaction, it is preferable to add the solid aluminum oxide in batches to the HF solution and to subject the mixture to vigorous agitation. Also, the speed of reaction can be increased by elevating the temperature to within the range from about 75° to about 100° C. and this is generally desirable.

As previously noted, particular advantages are gained by utilizing tower acid containing 3 to 5% HF as the HF raw material and use of this material is recommended for best results. However, the HF solution can be derived from other sources, such as the pyrohydrolytical decomposition of aluminum furnace carbonaceous wastes, and the concentration of HF in the solution may be higher, say, up to about 15%. After the supersaturated $AlF_3$ solution has been formed, $AlF_3$ may be precipitated therefrom in an improved manner by use of aluminum oxide as precipitation nuclei as is disclosed and claimed in the copending application of Arnfinn Ve entitled "Method of Producing Aluminum Fluoride", Ser. No. 608,984 filed Jan. 13, 1967.

Further details of the present invention will be apparent from the following example which constitutes one specific embodiment thereof.

To 1,000 kilograms of a 5% aqueous HF solution were added 292.5 kilograms of $Al_2O_3$ in batches with vigorous stirring and heating to about 90° C. Thus, the weight ratio of HF to $Al_2O_3$ was 1:5.85 as contrasted from the ratio of stoichiometric proportions, 1:0.85. When the reaction between the HF and added $Al_2O_3$ was completed, a suspension was formed containing 70 kilograms of dissolved $AlF_3$ and 250 kilograms of suspended $Al_2O_3$, and this constituted a 100% conversion of all of the original HF into $AlF_3$. The dissolved $AlF_3$ was precipitated on the surface of the remaining $Al_2O_3$. The resulting coprecipitate of $AlF_3$ and $Al_2O_3$ was dried, calcined and recycled as raw material to aluminum electrolytic furnaces.

It will be understood that it is intended to cover all changes and modifications of the preferred embodiment of the invention, herein chosen for the purpose of illustration, which do not constitute departures from the spirit and scope of the invention.

What is claimed is:

1. Method of producing supersaturated solutions of aluminum fluoride which comprises reacting a hydrofluoric acid in solution with at least a 50% excess of aluminum oxide over stoichiometric proportions at a temperature of at least about 75° C. but not greater than 100° C. to produce said supersaturated solution of aluminum fluoride.

2. Method as in claim 1 wherein said hydrofluoric acid solution contains about 3 to about 5% HF.

3. Method as in claim 2 wherein said hydrofluoric acid solution is formed by washing off gases from an electrolytic aluminum furnace with water.

4. Method as in claim 1 wherein said aluminum oxide is added to said hydrofluoric acid solution with vigorous agitation and elevation of temperature to within the range from about 75° to about 100° C.

5. Method as in claim 1 wherein said aluminum oxide is added in batches to said hydrofluoric acid solution.

6. Method as in claim 1 wherein said hydrofluoric acid solution contains up to about 15% HF.

References Cited

UNITED STATES PATENTS

| | | | |
|---|---|---|---|
| 2,842,426 | 7/1958 | Glocker | 23—88 |
| 2,920,941 | 1/1960 | Sanlaville et al. | 23—154 |
| 3,057,681 | 10/1962 | Gernes et al. | 23—88 |

FOREIGN PATENTS

| | | |
|---|---|---|
| 735,156 | 8/1955 | Great Britain. |

OTHER REFERENCES

McPherson & Henderson book "A Course in General Chemistry," Third Ed. (1927), page 211, Pub. by Ginn & Co., N.Y.

Hackh's "Chemical Dictionary," Third Ed. Revised (1944), page 39. McGraw-Hill Book Co., N.Y.

EDWARD STERN, Primary Examiner

U.S. Cl. X.R.

23—301; 204—67